US009569901B2

(12) United States Patent
Ito (10) Patent No.: US 9,569,901 B2
(45) Date of Patent: Feb. 14, 2017

(54) ELECTRONIC CONTROL UNIT THAT PERFORMS A LIFE-EXTENDING CONTROL, AND A VEHICLE CONTROL SYSTEM THAT INCLUDES THE ELECTRONIC CONTROL UNIT

(71) Applicant: DENSO CORPORATION, Kariya, Aichi-pref. (JP)

(72) Inventor: Hirotaka Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/919,902

(22) Filed: Oct. 22, 2015

(65) Prior Publication Data
US 2016/0140782 A1 May 19, 2016

(30) Foreign Application Priority Data
Nov. 13, 2014 (JP) ................... 2014-230775

(51) Int. Cl.
| | |
|---|---|
| G06F 19/00 | (2011.01) |
| H02J 7/00 | (2006.01) |
| G01R 31/00 | (2006.01) |
| G07C 5/08 | (2006.01) |
| B60K 28/10 | (2006.01) |
| G05B 23/00 | (2006.01) |

(52) U.S. Cl.
CPC ............. *G07C 5/08* (2013.01); *B60K 28/10* (2013.01); *G05B 23/00* (2013.01)

(58) Field of Classification Search
USPC ............................. 701/99; 320/134; 324/503
See application file for complete search history.

(56) References Cited

U.S. PATENT DOCUMENTS

| | | | | |
|---|---|---|---|---|
| 6,321,150 B1* | 11/2001 | Nitta | ...................... | B60K 6/543 701/32.7 |
| 7,714,543 B2* | 5/2010 | Yoshida | ............... | B60L 3/0038 320/134 |
| 7,865,281 B2* | 1/2011 | Iwai | ..................... | B60W 50/02 701/29.6 |

(Continued)

FOREIGN PATENT DOCUMENTS

| | | |
|---|---|---|
| JP | 2009-206850 A | 9/2009 |
| JP | 2011-068152 A | 4/2011 |

(Continued)

*Primary Examiner* — Tyler Paige
(74) *Attorney, Agent, or Firm* — Posz Law Group, PLC (57) ABSTRACT

An electronic control unit has a main controller that controls a drive of an actuator and a life-extending control instruction section that requests the main controller to change a drive condition of the actuator. The life-extending control instruction section includes a failure estimator that updates and outputs a failure rate based on a state of a control object, a life-extending control database that stores a failure rate reduction control of a monitoring object including the actuator, which reduces the failure rate of the monitoring object, when a failure of the monitoring object is estimated, and a control selector that searches the life-extending control database and selects a candidate control based on the failure rate of the monitoring object outputted from the failure estimator. The control selector requests the main control section to perform a life-extending control that changes an operation condition of the actuator.

17 Claims, 5 Drawing Sheets

(56) References Cited

U.S. PATENT DOCUMENTS

| | | | |
|---|---|---|---|
| 8,332,342 B1* | 12/2012 | Saha | G01R 31/3651 706/45 |
| 8,447,449 B2 | 5/2013 | Prucka | B60K 6/485 180/178 |
| 8,880,281 B2* | 11/2014 | Giles | G07C 5/085 701/29.1 |
| 9,306,477 B2* | 4/2016 | Matsunaga | H02P 1/00 |
| 2006/0058932 A1* | 3/2006 | Garg | B60K 6/32 701/32.8 |
| 2009/0299561 A1* | 12/2009 | Matsumoto | B60K 6/28 701/22 |
| 2010/0087976 A1* | 4/2010 | Aridome | B60K 6/405 701/22 |
| 2010/0213948 A1* | 8/2010 | Bauer | B60K 6/485 324/503 |
| 2010/0299045 A1* | 11/2010 | Moriya | F01M 1/16 701/102 |
| 2012/0029760 A1* | 2/2012 | Murakami | G07C 5/0808 701/30.8 |
| 2012/0197481 A1* | 8/2012 | Takeda | B60W 50/0205 701/31.4 |
| 2013/0041522 A1* | 2/2013 | Mori | G07C 5/0808 701/1 |
| 2014/0244099 A1* | 8/2014 | Kakinuma | G07C 5/0808 701/31.4 |
| 2014/0376587 A1* | 12/2014 | Sakashita | B60W 10/08 374/1 |
| 2015/0142789 A1* | 5/2015 | Parundekar | G06F 17/3053 707/724 |
| 2015/0330500 A1* | 11/2015 | Sujan | F16H 61/0204 701/55 |
| 2016/0140782 A1* | 5/2016 | Ito | B60K 28/10 701/99 |

FOREIGN PATENT DOCUMENTS

| | | |
|---|---|---|
| JP | 2013-077054 A | 4/2013 |
| JP | 2014-105680 A | 6/2014 |
| JP | 2014-159742 A | 9/2014 |
| JP | 2014-234105 A | 12/2014 |
| WO | 2014083397 A1 | 6/2014 |

* cited by examiner

| | | FAILURE RATE | | |
| --- | --- | --- | --- | --- |
| | | 20%—30% | ... | 80%—90% |
| ACTUATOR | ENG | EV TRAVEL RATE 10% UP | ... | EV TRAVEL ONLY |
| | MG2 INVERTER | W/P COOLING CAPACITY 10% UP | ... | DIRECT TORQUE LARGE |
| | ... | ... | ... | ... |
| | MG1 | ① EV TRAVEL RATE 10% UP<br>② OUTPUT DOWN | ... | EV TRAVEL ONLY |

ELECTRONIC CONTROL UNIT THAT PERFORMS A LIFE-EXTENDING CONTROL, AND A VEHICLE CONTROL SYSTEM THAT INCLUDES THE ELECTRONIC CONTROL UNIT

CROSS REFERENCE TO RELATED APPLICATION

The present application is based on and claims the benefit of priority of Japanese Patent Application No. 2014-230775, filed on Nov. 13, 2014, the disclosure of which is incorporated herein by reference.

TECHNICAL FIELD

The present disclosure generally relates to an electronic control unit that extends a product life of a control object device by performing a life-extending control for the device, and a vehicle control system that includes the above-described electronic control unit.

BACKGROUND INFORMATION

In various devices including a vehicle, a fail-safe control is performed, for the prioritizing the safety of the device at a device failure time. For example, a control unit in a vehicle that is described in a patent document, JP 2014-105680 A (patent documents 1) listed below performs a fail-safe control by (i) moving the variable valve operation mechanism to move toward a retarded side for positioning the mechanism to a preset position and (ii) using a signal from a cam-position sensor instead of a signal from a crank position sensor when the crank position sensor fails.

Thereby, at the device failure time, a sudden discontinuation of an engine control is prevented, and the user of such device in the vehicle is protected from an accident.

However, the fail-safe control is a safety measure of a post-failure timing, and does not control, or prevent, the failure itself. Further, the energy and resource saving movement in recent years is obliging device makers to manufacture less-failing and high-reliability products (i.e., an Electronic Control Unit (ECU)).

SUMMARY

It is an object of the present disclosure to provide an electronic control unit that extends a product life of a control object device, enabling the device to "live" a long life.

The present disclosure described in the following uses the following technical device and the like. The parenthesized numerals in the claims and in this section of the specification indicate a relationship between an element in the claims (i.e., a present specification) and an embodiment described later, thereby not limiting the technical scope of the present disclosure.

In one aspect of the present disclosure, an electronic control unit controls a drive of an actuator that is disposed on a control object. The electronic control unit includes a main controller that is configured to control the drive of the actuator based on a state of the control object, and a life-extending control instruction section communicably connected with the main controller and configured to request the main controller to change a drive condition of the actuator. The life-extending control instruction section includes a failure estimator that is configured to (i) having a failure estimation model to compute a failure rate of a monitoring object that includes the actuator, and (ii) updating and outputting the failure rate based on the state of the control object. Also, the life-extending control instruction section includes a life-extending control database that is configured to store a failure rate reduction control, the failure rate reduction control configured to reduce the failure rate of the monitoring object that is disposed in the control object. Further, the life-extending control instruction section includes a control selector that is configured to search the life-extending control database for failure rate reduction control candidates, and select at least one of the failure rate reduction control candidates as the failure rate reduction control based on the failure rate of the monitoring object outputted from the failure estimator. The control selector requests the main controller to perform a life-extending control that changes an operation condition of the actuator, based on the selected failure rate reduction control, when the failure rate of the monitoring object exceeds a preset threshold.

According to the above configuration, the failure rates of the monitoring objects including the actuator, which are computed according to the failure estimation model, are monitored from time to time. Then, if the failure rate of a specific monitoring object exceeds the predetermined threshold value, the control of the controlled object shifts from the normal control to a life-extending control. The life-extending control is a control, in which a drive condition of each of the actuators is changed so that the failure rate of the monitoring object concerned is reduced. As a result, compared with the conventional control, in which no life-extending control is performed, a time to failure of the monitoring object, or a product life of the monitoring object, is extended.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the present disclosure is described based on the drawing. In each of the drawings, the same numerals represent the same component or the equivalents.

First Embodiment

Figure 1:
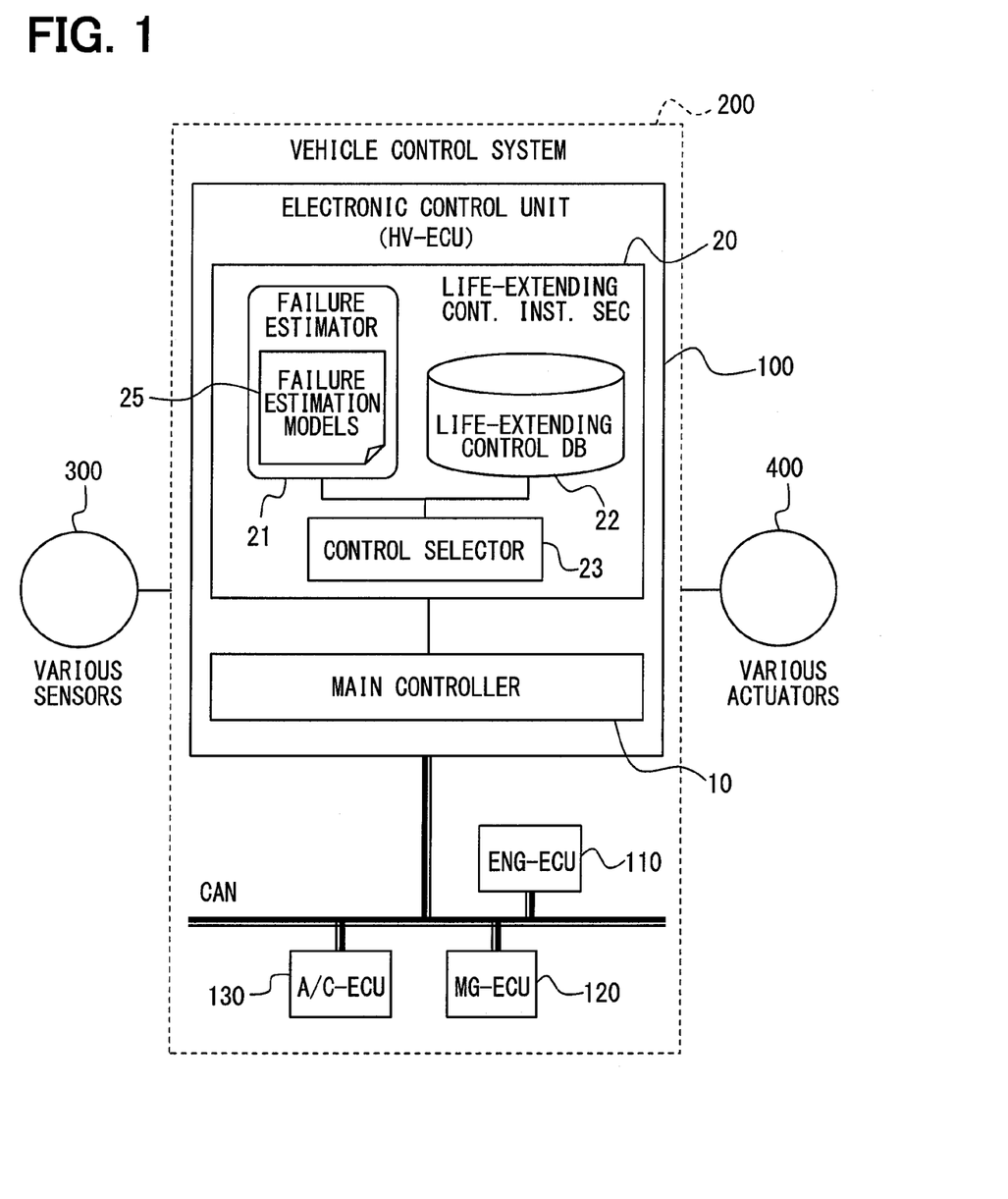
FIG. 1 is a block diagram of an electronic control unit and a vehicle control system in a first embodiment of the present disclosure.

First, with reference to FIG. 1, an exemplary configuration of an electronic control unit concerning the present embodiment is described.

In the present embodiment, a hybrid vehicle is controlled by an ECU, which may also be designated as Hybrid Vehicle-Electronic Control Unit (HV-ECU) in the following.

The following control of the ECU may not be only applicable to an automobile, but also be applicable to an electric train, or to other industrial machines.

As shown in FIG. 1, an ECU 100 in the present embodiment serves as a component of a vehicle control system 200, together with other components, such as an engine ECU 110, a motor generator ECU 120, an air-conditioner ECU 130, and other control devices that are not illustrated. Those ECUs 110-130 are connected with each other in a mutually-communicable manner via an in-vehicle network (e.g. a Controller Area Network (CAN)) for cooperatively performing a control for the vehicle. The in-vehicle network in the present embodiment has a master-slave configuration, in which the ECU 100 serves as a master. The CAN communication described as an in-vehicle network is only an example, and other communication standards, such as Local Interconnect Network (LIN), Safe-by-Wire, FlexRay and the like may also be eligible. Please note that "CAN" and "FlexRay" are the registered trademarks.

The vehicle control system 200 is connected with various sensors 300 that detect the state of a controlled object (i.e., the vehicle), and with various actuators 400 that are driven according to a result of a control.

The various sensors 300 may be, for example, a temperature sensor, an accelerator opening sensor, a steering angle sensor, an acceleration sensor, etc., for example, and each of those sensors detects the state of the vehicle and outputs information to the vehicle control system 200.

The various actuators 400 may be, for example, an engine, a motor, a booster converter, etc., which are actually driven based on the control signal outputted from the vehicle control system 200.

In more detail, when the state of the vehicle is input from the various sensors 300 to the ECU 100, the ECU 100 as a master determines a control based on such input, and sends a drive request for driving each of the various actuators 400 to each of the control devices 110-130, which are slaves. Then, upon receiving the request, each of the control devices 110-130 outputs a control signal for driving the various actuators 400.

The ECU 100 is provided with a main controller 10 and a life-extending control instruction section 20.

Based on the information about the state of the vehicle inputted from the various sensors 300 and the information inputted from each of the control devices 110-130, the main controller 10 determines a drive of each of the various actuators 400, and outputs a control signal to each of the control devices 110-130.

The life-extending control instruction section 20 is connected with the main controller 10 in a mutually-communicable manner, and "proposes" to the main controller 10 an execution of a life-extending control described in full details later on. The main controller 10, after checking and determining that the vehicle is in an affordable state in which such a proposal is acceptable for the vehicle, sends, to each of the control devices 110-130, a drive request of the actuators 400, so that the drive of the actuators 400 is switched to a proposed one, which is proposed by the life-extending control instruction section 20.

Figure 2:
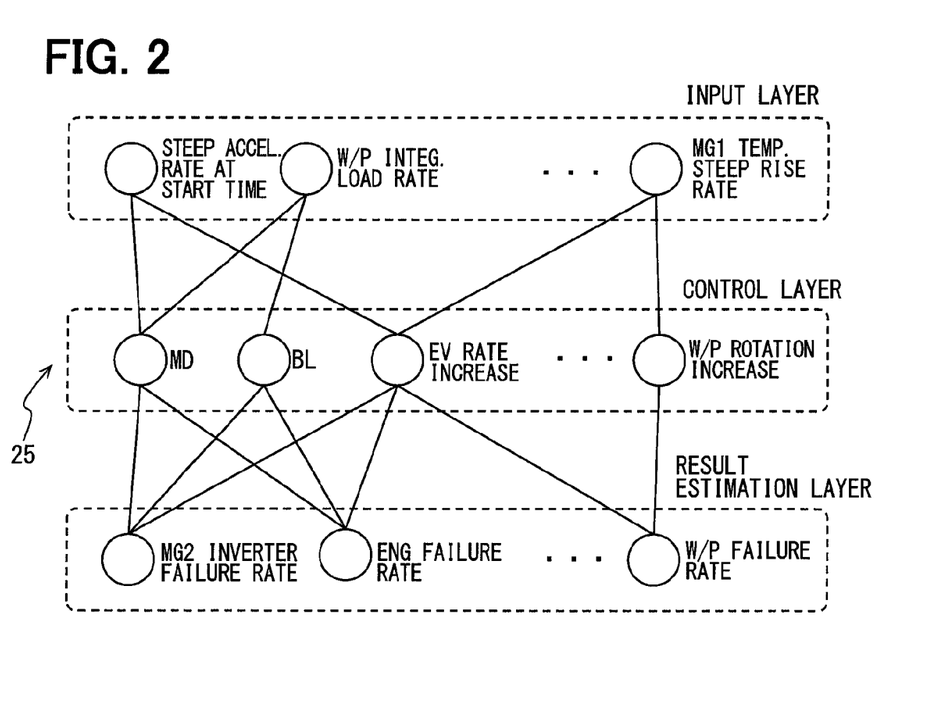
FIG. 2 is a diagram of failure estimation model.
Figure 3:
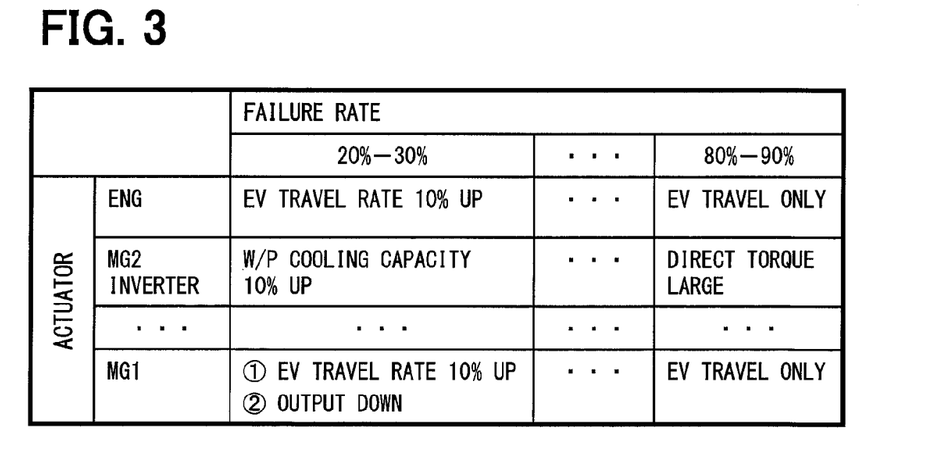
FIG. 3 is a diagram of a failure rate reduction control.

Next, with reference to FIGS. 1-3, the configuration of the life-extending control instruction section 20 is described in detail. The control object in the following example description is a series-parallel hybrid vehicle having two motors.

The life-extending control instruction section 20 includes a failure estimator 21 for computing a failure rate of the monitoring object including the actuators 400 and the various sensors 300, and a life-extending control database 22 for storing information regarding how a product life of each of the actuators 400 and the sensors 300, and a control selector 23 that is communicably connected with the failure estimator 21 and the life-extending control database.

Hereafter, for the ease of understanding and explanation, the monitoring objects are limited to the actuators 400. However, the monitoring objects may include not only the actuators 400 but may also include all the other devices and components that may have a failure, respectively, other than the various sensors 300.

The failure estimator 21 computes the failure rate of the actuators 400 based on a failure estimation model 25. The failure estimation model 25 may, for example, be a probability model that is implemented as the Bayesian network shown in FIG. 2. As for such a probability model, it is provided with at least three layers (i.e., an input layer, a control layer, and a result estimation layer).

In the input layer, physical quantities, obtained from the various sensors 300 and each of which represents the state of the vehicle, are set up as respective nodes.

The nodes set in the input layer may be, for example, a steep acceleration rate at a start time of the vehicle, an integrated load rate of a water pump (W/P), a temperature increase rate of the first motor-generator (MG 1, hereafter) and the like. The quantity that is input to the input layer is a frequency distribution of the physical quantities that are obtained from the various sensors 300.

In the control layer, behaviors of the various actuators 400 relevant to the nodes in the input layer are set up as respective nodes.

The nodes set in the control layer may be, for example, a motor drive (i.e., MD in FIG. 2), a battery-less travel (i.e., BL in FIG. 2), an increase of an EV travel rate, an increase of the number of W/P rotations, and the like.

The nodes in the control layer are associated to the nodes in the input layer by connection lines, or by links. In the example of FIG. 2, since the steep acceleration rate at a start time of the vehicle in the input layer depends on the motor drive and the increase of the Electric Vehicle (EV) travel rate in the control layer, those three nodes are connected by the links. Each of the nodes in the control layer has a conditional probability assigned to the each of the nodes, thereby allowing the probability (of a certain node) in the control layer to be computable as a product of (i) the probability that is input to the node in the input layer and (ii) the conditional probability of the node in the control layer.

In the result estimation layer, failure rates of the actuators 400, which vary according to the behaviors of the various actuators 400 that are set as the nodes in the control layer, are set as the nodes. The nodes set in the result estimation layer may be, for example, an inverter failure rate of the second motor generator (MG2), an engine (ENG) failure rate, a W/P failure rate, and the like.

The nodes in the result estimation layer are associated to the nodes in the control layer by the links. In the example of FIG. 2, since the motor drive MD, which is a node in the control layer, influences the inverter failure rate of MG2 and the ENG failure rate in the result estimation layer, those three nodes are connected by the links. The probability calculation scheme in the result estimation layer is the same as the one in the control layer (i.e., computable as the product of the probabilities of the relevant nodes).

The failure estimator 21 computes the failure rates of the various actuators 400 as a node in the result estimation layer based on the failure estimation model 25 in FIG. 2, which is further based on the state of the vehicle (i.e., the state of the controlled object) being inputted into the input layer as physical quantities detected by the various sensors 300.

The failure rates of the various actuators 400 are updated from time to time corresponding to the update frequency of the information inputted to the input layer.

Further, the failure estimation model 25 may also preferably be periodically updated at a vehicle service time in an auto dealer, or may always be updated via the Internet. Updating in this case means an update of either (i) an addition and a deletion of the node in each layer, (ii) an addition and a deletion of the link that connects the nodes, or (iii) a frequency or a probability defined in each node. The updatable/renewable configuration of the failure estimation model 25 enables the failure rate the actuators 400 to always be computed according to the latest failure estimation model 25. In other words, the accuracy of computation of the failure rate is improved.

The life-extending control database 22 is a database in which a control, or a means, that reduces a failure rate of the relevant actuator(s) 400 is stored as a failure rate reduction control. The failure rate reduction control is set up in association with the actuators 400, as shown in FIG. 3.

For example, for the ENG, which is one of the actuators 400, a control of increasing the EV travel rate by 10% is set as one of the failure rate reduction controls.

Further, for the inverter of MG2, a control of increasing the cooling capacity by W/P by 10% is set as one of the failure rate reduction controls.

Further, for MG1, a control of (i) increasing the EV travel rate by 10% or (ii) decreasing the output is set as one of the failure rate reduction controls.

As the failure rate reduction controls corresponding to MG1, multiple failure rate reduction controls may be set to one actuator 400. Further, it is not necessary for all the actuators 400 to have at least one failure rate reduction control.

In the present embodiment, for each of the actuators 400, multiple failure rate reduction controls are set according to the failure rate computed by the failure estimator 21.

More practically, for the engine (ENG), as shown in FIG. 3, the failure rate reduction control is set as a control to increase the EV travel rate for the computed failure rate in a range of 20% and 30%, and the failure rate reduction control is set as a control to only perform the EV travel for the computed failure rate in a range of 80% and 90%.

Further, the failure rate reduction control may preferably be periodically updated at a vehicle service occasion in an auto dealer, or may always be updated via the Internet. The updatable configuration of the failure rate reduction control enables the control of the actuators 400 to be performed with the latest failure rate reduction control. Therefore, the ECU 100 can select a control which can extend the product life of the actuators 400 to the full.

The control selector 23 selects the failure rate reduction control from the life-extending control database 22 based on the failure rate of the various actuators 400 computed by the failure estimator 21. Then, the control selector 23 proposes to the main controller 10 that the selected failure rate reduction control is executable as a life-extending control.

Selection of the failure rate reduction control is performed when the failure rate computed by the failure estimator 21 exceeds a predetermined threshold value, and then the life-extending control is performed. In the following, the selection of the failure rate reduction control is described based on an assumption that the failure rate reduction controls shown in FIG. 3 are all stored in the life-extending control database 22.

For example, consider a case where the failure rate of the engine malfunction is computed by the failure estimator 21 as 24%. According to FIG. 3, the failure rate reduction control for the failure rate in a range between 20% and 30% is a control to increase the EV travel rate. In this example, the predetermined threshold value indicates a failure rate of 20%. In other words, when the computed failure rate of the engine exceeds a threshold of 20%, increasing the EV travel rate is considered as a candidate for the failure rate reduction control. Further, according to FIG. 3, when the failure rate exceeds 80%, performing the EV travel only will be considered as a candidate for the failure rate reduction control.

Figure 4:
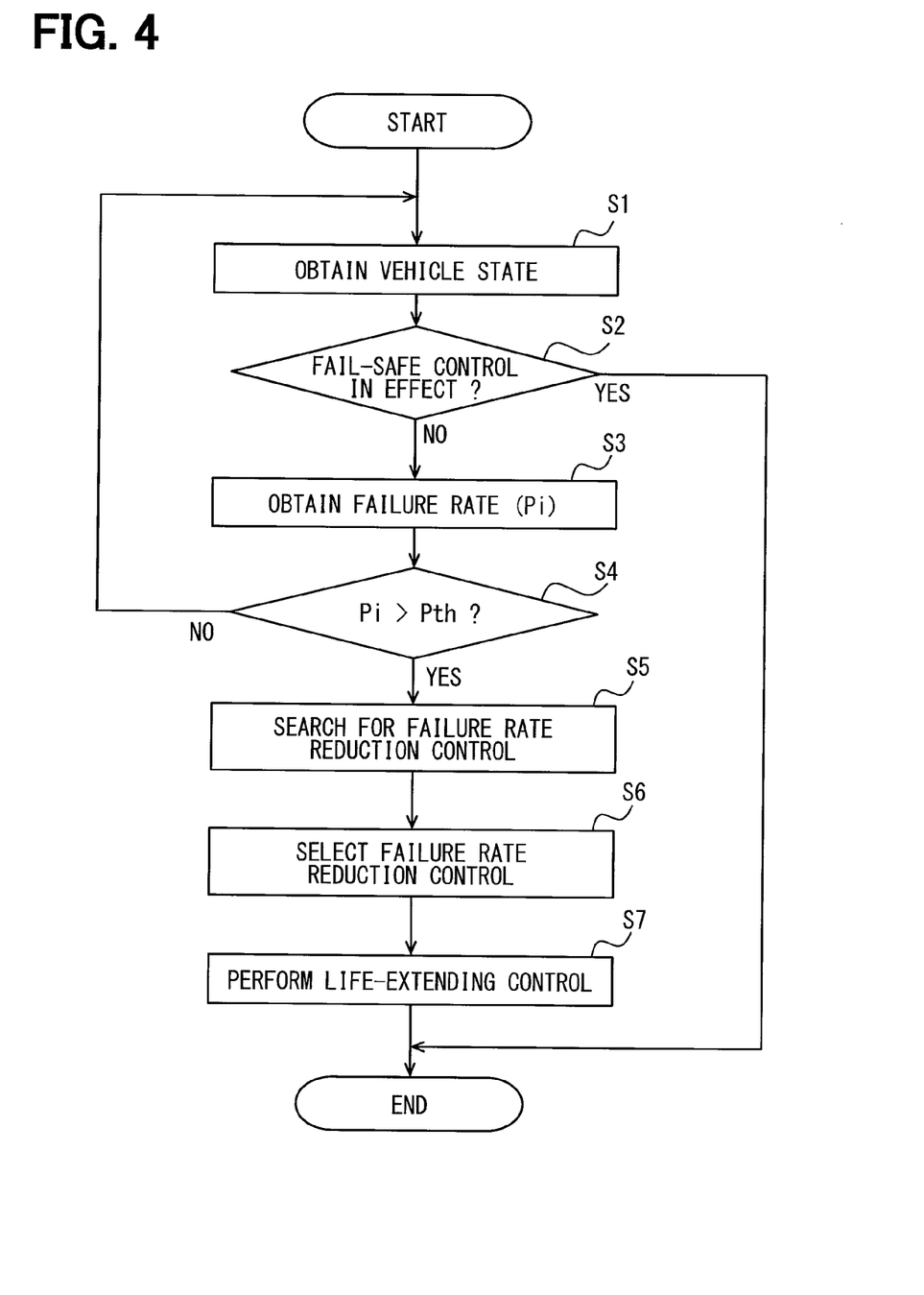
FIG. 4 is a flowchart of a control performed by the electronic control unit.

Next, with reference to FIG. 4, a flow of controls regarding the life-extending control in the ECU 100 is described.

First, Step S1 is performed. Step S1 is a step in which the main controller 10 and the life-extending control instruction section 20 receive information from the various sensors 300, and from each of the control devices 110-130, for obtaining the state of the vehicle. The state of the vehicle includes the physical quantities detected by the various sensors 300 and the driving state of the actuators 400. The main controller 10 and the life-extending control instruction section 20 accumulate the received information in a memory or the like (not illustrated). The information accumulated in the memory contains statistical data that is represented as the frequency distribution of variables regarding the state of the vehicle in the received information.

Subsequently, Step S2 is performed. Step S2 is a step in which the main controller 10 determines whether a fail-safe control of the vehicle is in effect (i.e., is being performed). The ECU 100 in the present embodiment is configured not to perform the life-extending control when the fail-safe control is in effect (i.e., prioritizing the safety of the travel of the vehicle). That is, if the fail-safe control of the vehicle is being performed, Step S2 branches to a YES determination, and the control flow of control of the life-extending control is finished. On the other hand, if the fail-safe control of the vehicle is not being performed (i.e., without the fail-safe control being in effect), Step S2 branches to a NO determination, and the process proceeds to Step S3. Further, Step S2 is not necessarily performed after Step S1. That is, Step S2 may be performed at any timing as long as Step S2 comes after Step S1 and comes before Step S6 that is mentioned later.

Step S3 is a step in which the control selector 23 obtains the failure rate (Pi) of the various actuators 400 from the failure estimator 21. The failure estimator 21 computes the failure rate of the various actuators 400 based on the failure estimation model 25 by considering the state of the vehicle obtained in Step S1 as an input (to the model). In Step S3, the failure rate Pi computed by the control selector 23 is obtained from the failure estimator 21.

The failure rate Pi is obtained as a value that corresponds to the actuator 400 whose product life is desired to be extended. Therefore, at least one Pi is obtained.

The following steps are described based on an assumption that the failure rate Pi of MG2 inverter is computed as 25%.

Step S4 is performed after Step S3. Step S4 is a step in which the control selector 23 compares the failure rate Pi of the actuators 400 obtained in Step S3 with a predetermined threshold value Pth set up in advance.

Here, the predetermined threshold value Pth may be set individually for each of the actuators 400, or may be uniformly set to all of the actuators 400. Further, each of the actuators 400 may have more than one threshold value Pth (i.e., one actuator 400 may have two or more threshold values Pth assigned to the actuator 400), which increases in a stepwise manner.

In the present embodiment, as shown in FIG. 3, the failure rate reduction controls are set for one actuator 400 according to the failure rate. In other words, the threshold values Pth are set in a gradually-increasing stepwise manner (e.g., Pth=20%, 30%, - - - , 80%, or the like). In the description so far, the failure rate Pi of the MG2 inverter is computed as 25%, and a relationship Pi>Pth is satisfied. Therefore, Step S4 branches to a YES determination, and the process proceeds to Step S5.

In the case that a relationship Pi>Pth is not satisfied, it leads to a NO determination, and the process returns to Step S1, or the control flow of the life-extending control is finished.

Step S5 is a step in which the control selector 23 searches for an appropriate failure rate reduction control, based on the failure rate Pi obtained from the failure estimator 21, and the failure rate reduction control stored in the life-extending control database 22. As mentioned above, the failure rate Pi of the MG2 inverter is in a range between 20% and 30%, a control to increase the cooling capacity by 10% is picked up as a candidate control from among the failure rate reduction controls shown in FIG. 3.

Subsequently, Step S6 is performed. Step S6 is a step in which the failure rate reduction control that should be performed for the reduction of the failure rate is selected from among the searched candidate controls. Then, the control selector 23 sends a request to the main controller 10, so that the drive condition of one of the various actuators 400 is changed to a condition regarding the life-extending control, based on the selected failure rate reduction control.

Subsequently, Step S7 is performed. Step S7 is a step in which the main controller 10 changes the drive condition of each of the various actuators 400 based on the failure rate reduction control selected in Step S6, and performs the life-extending control. In the present embodiment, the main controller 10 instructs a control device that is in charge of the control of W/P to increase the cooling capacity by 10%. Thereby, compared with the normal control, the cooling capacity by W/P in the vehicle is increased by 10% (i.e., the vehicle is put in a life-extending control performed state). In case that the cooling capacity of W/P is set to a value of more than 100% by the life-extending control, for example, the capacity value should be clamped to the maximum capacity of 100%.

Next, the operation effect by adopting the ECU 100 concerning the present embodiment is described.

As described above, the ECU 100 is provided with the life-extending control instruction section 20. When the failure rate of the actuator disposed in the vehicle exceeds the predetermined threshold value, the life-extending control instruction section 20 sends a request to the main controller 10 to perform a control that reduces the failure rate. Therefore, if the life-extending control is performed by the main controller 10, compared with the case where the actuators 400 are driven by the normal control, the failure rate of the actuators 400 each of which is the target of the life-extending control is reduced. Therefore, compared with the conventional control in which the life-extending control is not performed, a time to failure of the actuator 400 (i.e., a product life of the actuator 400) is extended. As a result, the life of the vehicle, which is the controlled object, is extended.

Further, the life-extending control database 22 in the present embodiment has multiple failure rate reduction controls according to (the level of) the failure rate of each of the actuators 400, an appropriate life-extending control according to the level of the failure rate is performable.

As an increase of the failure rate is estimated/predicted, the failure rate reduction control concerning the life-extending control corresponding to the increased (i.e., high) failure rate may highly probably be a drivability-damaging control, which reduces the ease and joy of driving by the vehicle user.

Therefore, by having many failure rate reduction controls in a stepwise manner according to the different levels of the failure rate, the life-extending control for a relatively-low failure rate is performable without drastically damaging the drivability of the vehicle.

Further, by periodically updating the failure estimation model 25 at a dealership or by the use of the latest one via the Internet, the failure rate of the actuator 400 is accurately computable by using the latest failure estimation model 25.

Furthermore, by always updating the failure rate reduction control, the control of the actuator 400 is performable by using the latest failure rate reduction control.

Second Embodiment

Figure 5:
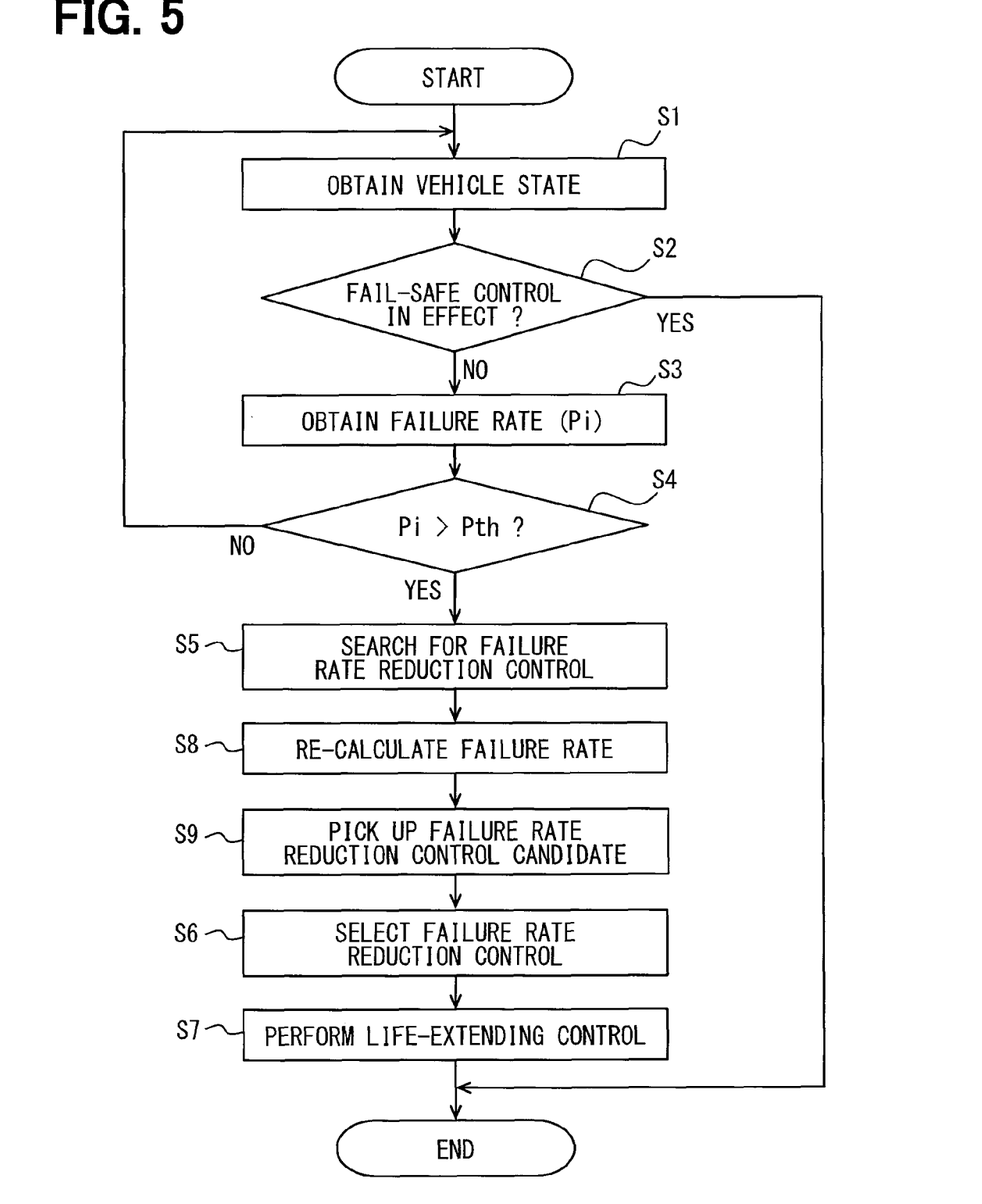
FIG. 5 is a flowchart of a control of the electronic control unit in a second embodiment of the present disclosure.

In addition to the configuration of the first embodiment, a candidate for the failure rate reduction control may (preferably) be reflected to the failure estimation model 25. More practically, as shown in FIG. 5, Step S8 and Step S9 may be added to the control flow at a position between Step S5 and Step S6.

Figure 6:
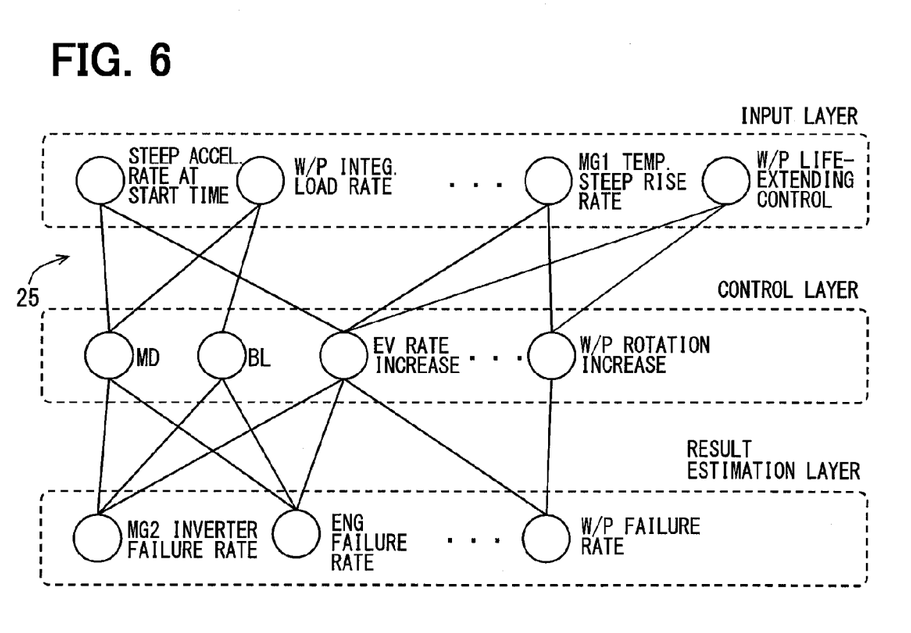
FIG. 6 is a diagram of a failure estimation model in the second embodiment of the present disclosure.

Step S8 is a step in which the control selector 23 re-calculates the failure rate of the actuators 400, after adding a node to the input layer of the failure estimation model 25, which (i.e., the added node) is a candidate for the failure rate reduction control. The same example as the first embodiment is used for describing the situation. In Step S5, a control to increase the cooling capacity of W/P by 10% is searched for as a candidate for the failure rate reduction control. The control selector 23 instructs the failure estimator 21 to add a node, to increase the cooling capacity of W/P by 10%, to the input layer of the failure estimation model 25, as shown in FIG. 6. The failure estimator 21 re-calculates the failure rates of the actuators 400, based on the nodes in the input layer including the newly added node.

Subsequently, Step S9 is performed. Step S9 is a step in which the control selector 23 picks up (i.e., sorts by applying a criterion or a condition), one searched control from among many controls as the failure rate reduction control.

For example, when the re-calculated failure rate Pi in Step S8 is equal to or less than a preset threshold value, the failure rate reduction control yielding such a failure rate is picked up as (i.e., is included in) a candidate for the life-extending control, and, when the re-calculated failure rate Pi in Step S8 is greater than a preset threshold value, the failure rate reduction control yielding such a failure rate is excluded, or is precluded, from a candidate for the life-extending control.

The preset threshold value in such case may be the same value as the threshold value Pth in Step S4, or may be defined as a different value from the threshold value Pth.

By devising such configuration, an increase of the failure rate of the other actuator(s) 400 other than the intended actuator 400, whose product life is intended to extend by performing the life-extending control, is prevented. In other words, a life-extending control with very few or no drawback is picked up and performed in such manner.

Modification 1

Further, the configuration of the second embodiment is useful and valid when many (i.e., plural) failure rate reduction controls are searched in one search in Step S5. For example, as the failure rate reduction controls listed in one slot of FIG. 3 (i.e., an intersection of MG1 and the failure rate of 20% to 30%), plural (i.e., two) failure rate reduction controls correspond to one actuator having a certain failure rate. Alternatively, the failure rate of multiple actuators 400 may exceed a predetermined threshold value Pth.

In such case, in Step S8, plural failure rate reduction controls are independently added to the input layer of the failure estimation model 25, respectively, and the failure rate is re-calculated by adopting each of the plural failure rate reduction controls. Then, in Step S9, a failure rate reduction control yielding the smallest increase of the failure rate for each of the multiple actuators 400 is picked up as a candidate for the life-extending control.

In such manner, an increase of the failure rate of the actuator(s) 400 that is/are different from the intended actuator(s) 400, whose product life is intended to extend by performing the life-extending control, is prevented.

Third Embodiment

In each of the above-mentioned embodiments and modifications, a candidate for the failure rate reduction control is picked up based on the failure rate computed by the failure estimator 21 in Step S5.

However, in addition to the failure rate, other criteria or standards may also be used for the pick-up of a candidate for the failure rate reduction control.

Generally, when an actuator 400 is broken, such an actuator 400 is replaced at an automobile dealer or the like. For the replacement of the actuator 400, a cost for replacement is required. Therefore, as a different criterion mentioned above, a replacement cost of the actuator 400 may be adopted, for example.

More practically, in addition to the failure estimation model 25, the failure estimator 21 in the present embodiment may have a price data in which the replacement cost of the various actuators 400 is recorded. Further, the failure estimator 21 performs a weighting of the replacement cost, which is based on the price data, to the failure rate that is computed by the failure estimation model 25, and outputs the weighted failure rate to the control selector 23.

As an increase of the failure rate is estimated/predicted, the failure rate reduction control concerning the life-extending control corresponding to the increased (i.e., high) failure rate may highly probably be a drivability-damaging control, which reduces the ease and joy of driving by the vehicle user.

If the failure estimated actuator 400 is relatively cheap, the replacement of the actuator 400 may be prioritized than the deteriorated drivability due to the life-extending control. In such case, the search of the failure rate reduction control may preferably be performed by a combination of the failure rate and the price data, as shown in the present embodiment. In such search scheme, the price data serves as a "filter." Therefore, even when a high failure rate is computed/estimated, the user may have a freedom of choice among the two options (e.g., (A) the life-extending control not performed due to a relatively-cheap repair/replacement cost of the actuator 400, or (B) performing the life-extending control to extend the product life of the actuator 400, for not replacing a very high price actuator 400).

Fourth Embodiment

As the failure rate reduction control (FIG. 3) shown in each of the above-mentioned embodiments and modifications, plural failure rate reduction controls can be set up for one actuator 400 for a certain failure rate. For example, MG1 in FIG. 3 for the failure rate between 20% and 30%, two failure rate reduction controls are available (e.g., (i) 10% up (i.e., increase) of the EV travel rate and (ii) output down (i.e., decrease of the output)).

In such case, the control selector 23 may be configured to allow the user to choose from the above-described two controls. More practically, in Step S6 shown in FIG. 4 or 5, the control selector 23 presents the user (plural) candidates for the failure rate reduction controls selected in Step S5 or Step S9, and leaves the selection to the user's disposal. Then, after the selection of one control by the user, the life-extending control is performed in Step S7 according to the selected control.

When the control selector 23 presents the user the failure rate reduction controls, each of the failure rate reduction controls may be presented for the user with its merits and demerits in case that the specific failure rate reduction control is performed, which may be provided from a display unit of a vehicle navigation system or from other device on an instrument panel.

In terms of the merits of the control, a failure rate after performing the control may be re-calculated as shown in Step S8 of the second embodiment, and the re-calculation result may be presented for the user.

In terms of the demerits, the drawback of the failure rate reduction control (i.e., a deterioration caused by the performance of a certain failure rate reduction control) is presented for the user. More practically, the drawback caused by the increase of the EV travel rate, which is one of the failure rate reduction controls of the MG1, may be a reduced product life of the secondary battery, and the drawback caused by the decrease of the output may be a deterioration of the drivability. In view and full understanding of the merits and demerits, the user can determine whether the life-extending control should be performed, and which one of many controls should be performed.

Modification 2

According to the fourth embodiment, although the user has a freedom of choice among the available failure rate reduction control prior to actually performing the selected failure rate reduction control, such a scheme (i.e., a failure rate reduction control selection scheme) may be further extended for the user to pre-define such a selection criteria.

As the failure rate reduction control (FIG. 3) shown in each of the above-mentioned embodiments and modifications, a different failure rate reduction control can be set up for a certain (one) actuator 400 in association to each of the two or more failure rates of such actuator 400. For example, when the engine (ENG) in FIG. 3 is a subject actuator 400, the failure rate reduction control for the failure rate between 20 to 30% is the increase of the EV travel rate by 10%, and the failure rate reduction control for the failure rate between 80 to 90% is the EV travel only. In such case (i.e., when two or more (i.e., different)) failure rate reduction controls are set according to the different failure rates, the modification 2 for the selection of the failure rate reduction controls may be implemented as setting of non-use of a certain control for a failure rate exceeding a threshold. For example, the user may instruct the control selector 23, in advance, not to use/adopt the failure rate reduction control that is defined for, or corresponding to, the failure rate of 70% or above. In such manner, the control selector 23 precludes the failure rate reduction control corresponding to the failure rate of 70% or more from the candidate of the life-extending control, thereby preventing an unwanted deterioration of the drivability from being caused for the comfort of the user.

As the other example, the user may pre-instruct the control selector 23 not to use/adopt the failure rate reduction control that has a drawback causing the deterioration of the drivability. In such case, the control selector 23 precludes the failure rate reduction control, which has a drawback of deteriorated drivability from the candidate for the life-extending control.

By adopting the above-described configurations, the life-extending control is suitably adjusted to, or curtailed for, the user preferred driving style.

Other Embodiments

Although the present disclosure has been described in connection with preferred embodiment thereof with reference to the accompanying drawings, it is to be noted that various changes and modifications will become apparent to those skilled in the art.

For example, in the selection of the failure rate reduction control shown in Step S6 (of FIG. 4 and FIG. 5) of the control flow of the ECU 100 for each of the above-mentioned embodiments, the number of the failure rate reduction controls selected in Step S6 may not necessarily be only one.

That is, when the failure rate of the engine (ENG) and the failure rate of the MG2 inverter respectively exceed 20%, two failure rate reduction controls in FIG. 3 (i.e., the one corresponding to the engine (ENG) to increase the EV travel rate by 10% and the one corresponding to the MG2 inverter to increase the cooling capacity of W/P by 10%) may be performed in combination at the same time as a "complex/joint" life-extending control.

In such manner, plural (i.e., two) actuators 400 respectively have an extended product life.

In the case when the vehicle is already in a life-extending control execution state after performing Step S7 of the flow control in the ECU 100, which is described in each of the above embodiments, a failure of another actuator 400 may be newly determined based on the computed failure rate that exceeds a certain threshold value. In such case, the control selector 23 may be configured to compare two failure rates, (i.e., comparing (i) the failure rate of one scenario in which the currently-executed life-extending control for the extended life of a certain actuator 400 is cancelled with (ii) the failure rate in another scenario in which the newly determined failing actuator 400 is considered as a subject of failure rate computation).

Then, the control selector 23 selects a failure rate reduction control corresponding to an actuator 400 having/yielding a higher failure rate as a candidate for the life-extending control.

In such manner, the life-extending control is applied to an actuator 400 that is more probable to fail (i.e., the failure of which is more worried about).

Further, during a time when the life-extending control is being performed, the main controller 10 may preferably present the user by using a notification unit, which may be a display unit of a vehicle navigation system or other device on an instrument panel, that the life-extending control is being performed.

For example, when the life-extending control is being performed, a light unit on the instrument panel may be lighted. In such manner, the user is notified that a subject actuator 400 for which the life-extending control is being performed is not in a good condition, which in turn provides the user with a sense of comfort and security based on the notion that he/she is in full command of the vehicle's condition. Further, the user can take advantage of such notification from the notification unit to bright the vehicle to the dealer or the like before the failure of the subject actuator 400, for example. Therefore, by bringing the vehicle to the dealer prior to the failure, the repair cost of the vehicle is reduced.

Further, the notification unit may be configured to present the user the computed failure rate of the subject actuator 400, in a user-decidable manner. For example, the lighting color of the light unit may be changed according to the computed failure rate.

Although the object of the control that is performed by the ECU 100 is described as a vehicle in each of the above-described embodiments and modifications, the other devices such as a train, an industrial machine and the like may also be the object of the above-described control.

Such changes, modifications, and summarized schemes regarding the above are to be understood as being within the scope of the present disclosure as defined by appended claims.

What is claimed is:

1. An electronic control unit controlling a drive of an actuator that is disposed on a control object, the electronic control unit comprising:
a main controller that is configured to control the drive of the actuator based on a state of the control object; a
life-extending control instruction section communicably connected with the main controller and configured to request the main controller to change a drive condition of the actuator, wherein
the life-extending control instruction section includes:
a failure estimator configured to (i) having a failure estimation model to compute a failure rate of a monitoring object that includes the actuator and (ii) updating and outputting the failure rate based on the state of the control object;
a life-extending control database configured to store a failure rate reduction control, the failure rate reduction control configured to reduce the failure rate of the monitoring object that is disposed in the control object; and
a control selector configured to search the life-extending control database for failure rate reduction control candidates, and select at least one of the failure rate reduction control candidates as the failure rate reduction control based on the failure rate of the monitoring object outputted from the failure estimator, and
the control selector requests the main controller to perform a life-extending control that changes an operation condition of the actuator, based on the selected failure rate reduction control, when the failure rate of the monitoring object exceeds a preset threshold,
wherein the life-extending control database has, for each of the monitoring object, a plurality of failure rate reduction controls according to a level of step-wise failure rates.

2. The electronic control unit of claim 1, wherein
the control selector selects the failure rate reduction control among the plurality of failure rate reduction controls according to a filtering criterion that is different from the failure rate, when more than one monitoring objects are estimated to have the failure.

3. The electronic control unit of claim 1, wherein
the control selector adds a failure rate reduction control as a candidate of an input node in an input layer of the failure estimation model, and compares (i) the failure rate of the monitoring object which has been changed due to an addition of the input node with (ii) a preset threshold, the failure rate reduction control is considered as a candidate of the life-extending control, when the changed failure rate due to the addition of the input node is equal to or less than the preset threshold, and the failure rate reduction control is excluded from being the candidate of the life-extending control, when the changed failure rate due to the addition of the input node is greater than the preset threshold.

4. The electronic control unit of claim 1, wherein
the control selector (i) adds each of the plurality of failure rate reduction controls an input node of the failure estimation model, and (ii) selects, from among the plurality of the failure rate reduction control candidates, one failure rate reduction control that yields a minimum increase amount of the failure rate of the monitoring object after the addition of the input nodes, when the plurality of failure rate reduction controls correspond to a failure rate of one monitoring object.

5. The electronic control unit of claim 1, wherein
the control selector (i) adds each of the plurality of failure rate reduction controls corresponding to each the plurality of the failure-estimated monitoring objects as an input node of the failure estimation model, and (ii) selects, from among the plurality of failure rate reduction controls, one failure rate reduction control that yields a minimum increase amount of the failure rate of the monitoring object after the addition of the input nodes, when a plurality of the monitoring objects are estimated to have a failure.

6. The electronic control unit of claim 1, wherein
the control selector presents the user a merit and a demerit of each of the plurality of failure rate reduction controls corresponding to the failure rate of one monitoring object, and requests the main controller to change the operation condition of the actuator based on the failure rate reduction control selected by the user, when the plurality of failure rate reduction controls correspond to a failure rate of one monitoring object.

7. The electronic control unit of claim 1, wherein
the control selector requests the main controller to change the operation condition of the actuator based on the failure rate reduction control corresponding to the monitoring object having a higher failure rate, when (i) the life-extending control is being performed for a first monitoring object, and (ii) the failure rate of a second monitoring object exceeds a present threshold.

8. The electronic control unit of claim 1, wherein
the control selector picks up the failure rate reduction control corresponding to a smaller failure rate that is smaller than a user-set value as a candidate of the life-extending control.

9. The electronic control unit of claim 1, wherein the control selector (i) selects the plurality of failure rate reduction controls as the life-extending control, and (ii) requests the main controller to change the operation condition of the actuator based on all of the plurality of failure rate reduction controls selected by the control selector, for performing a complex life-extending control, when the plurality of failure rate reduction controls are selected as a candidate for the life-extending control.

10. The electronic control unit of claim 1, wherein
the failure rate estimation model and the failure rate reduction control are both updatable via communication with an external device.

11. The electronic control unit of claim 1, wherein
the main controller accepts a request for the life-extending control from the life-extending control instruction section when the control object is without a fail-safe control in effect.

12. The electronic control unit of claim 1, wherein
the main controller includes a notification unit notifying a user of a performance of the life-extending control during a time when the life-extending control is being performed.

13. The electronic control unit of claim 12, wherein
the notification unit notifies the user of the failure rate of the monitoring object that corresponds to the failure rate reduction control being currently performed by the life-extending control, the notification of the failure rate is brought about in a user-decidable manner.

14. The electronic control unit of claim 1, wherein
the actuator comprises one of an engine, a motor, and a converter.

15. The electronic control unit of claim 1, wherein
the control object comprises a vehicle.

16. The electronic control unit of claim 1, wherein
the failure estimator estimates the failure rate according to the failure estimation model, based on an input from a plurality of different sensors and a measurement of operation states of a plurality of different actuators, in view of a user-selected operation trend or a user-selected component load trend, for searching the life-extending control database for the failure rate reduction control, based on the estimated failure rate.

17. A vehicle control system, comprising:
a sensor that senses a state of a control object;
an actuator that is disposed on the control object;
an electronic control unit connected to the sensor and the actuator, the electronic control unit configured to control a drive of the actuator and configured to include:
a main controller that is configured to control the drive of the actuator based on a state of the control object;
a life-extending control instruction section communicably connected with the main controller and configured to request the main controller to change a drive condition of the actuator, wherein
the life-extending control instruction section includes:
a failure estimator configured to (i) having a failure estimation model to compute a failure rate of a monitoring object that includes the actuator and (ii) updating and outputting the failure rate based on the state of the control object;
a life-extending control database configured to store a failure rate reduction control, the failure rate reduction control configured to reduce the failure rate of the monitoring object that is disposed in the control object; and
a control selector configured to search the life-extending control database for failure rate reduction control candidates, and select at least one of the failure rate reduction control candidates as the failure rate reduction control based on the failure rate of the monitoring object outputted from the failure estimator, and the control selector requests the main controller to perform a life-extending control that changes an operation condition of the actuator, based on the selected failure rate reduction control, when the failure rate of the monitoring object exceeds a preset threshold,
wherein the life-extending control database has, for each of the monitoring object, a plurality of failure rate reduction controls according to a level of step-wise failure rates.

* * * * *